(12) United States Patent
Loeb

(10) Patent No.: US 7,146,239 B2
(45) Date of Patent: Dec. 5, 2006

(54) METHODS AND SYSTEMS FOR COORDINATING CUSTOMIZED MANUFACTURING OF CONSUMER PRODUCTS

(75) Inventor: Michael R. Loeb, New York, NY (US)

(73) Assignee: Loeb Enterprises, LLC, New York, NY (US)

( * ) Notice: Subject to any disclaimer, the term of this patent is extended or adjusted under 35 U.S.C. 154(b) by 0 days.

(21) Appl. No.: 11/061,182

(22) Filed: Feb. 18, 2005

(65) Prior Publication Data

US 2006/0190122 A1    Aug. 24, 2006

(51) Int. Cl.
G06F 19/00        (2006.01)
(52) U.S. Cl. ............................ 700/133; 700/136
(58) Field of Classification Search ............... 700/99, 700/104, 109, 111, 130, 131, 132; 705/8
See application file for complete search history.

(56) References Cited

U.S. PATENT DOCUMENTS

| | | | |
|---|---|---|---|
| 4,136,452 A | | 1/1979 | McMillan |
| 5,111,391 A | * | 5/1992 | Fields et al. .................... 705/9 |
| 5,233,534 A | * | 8/1993 | Osthus et al. ................ 700/100 |
| 5,680,314 A | | 10/1997 | Patterson et al. |
| 5,680,528 A | | 10/1997 | Korszun |
| 5,768,135 A | * | 6/1998 | Park et al. ................... 700/130 |
| 5,930,769 A | | 7/1999 | Rose |
| 6,049,776 A | * | 4/2000 | Donnelly et al. ............... 705/8 |
| 6,249,715 B1 | * | 6/2001 | Yuri et al. ................... 700/111 |
| 6,415,199 B1 | | 7/2002 | Liebermann |
| 6,516,240 B1 | * | 2/2003 | Ramsey et al. ............. 700/131 |
| 6,546,309 B1 | | 4/2003 | Gazzuolo |
| 6,564,118 B1 | * | 5/2003 | Swab ......................... 700/131 |
| 6,665,577 B1 | * | 12/2003 | Onyshkevych et al. ..... 700/130 |
| 6,701,207 B1 | | 3/2004 | Gazzuolo |
| 6,711,455 B1 | | 3/2004 | Holloway et al. |
| 6,754,874 B1 | * | 6/2004 | Richman .................... 715/507 |
| 2001/0042029 A1 | | 11/2001 | Galvez |

OTHER PUBLICATIONS

"IC3D Jeans", [www.ic3d.com/aboutus/more_technology.html], (1996-2003), 19 pages.

* cited by examiner

Primary Examiner—Danny Worrell
(74) Attorney, Agent, or Firm—JLB Consulting, Inc.; Jeffrey L. Brandt

(57) ABSTRACT

There are provided methods and systems for manufacturing consumer products such as clothing. In accordance with the invention, customer measurements and preferences are collected by a unique, small-footprint or private custom clothing shop. These measurements and preferences are stored and used in association with the manufacturer of custom clothing. Ordered clothing is manufactured through the provision of patterns, instructions and materials to skilled, pre-qualified sewing associates. In one embodiment of the invention, the consumer products are "broken" into discrete, separately-manufacturable pieces, each piece for assembly by a separate, geographically remote, skilled labor with final assembly of the various pieces is performed at a centralized location. Customized clothing can thus be manufactured by a highly skilled, cost effective and geographically disperse labor force, using electronically stored data and electronic communications to both coordinate manufacturing and ensure high-quality results.

17 Claims, 3 Drawing Sheets

METHODS AND SYSTEMS FOR COORDINATING CUSTOMIZED MANUFACTURING OF CONSUMER PRODUCTS

FIELD OF THE INVENTION

The present invention relates generally to manufacturing and more particularly to methods and systems for managing customized manufacture of consumer products.

BACKGROUND OF THE INVENTION

The manufacture of consumer clothing by offshore suppliers has dramatically increased during the last 25 years. Currently, only 4% of the total retail clothing industry spending of $172.8 B is spent on wares manufactured in the United States. The balance of the retail spending is spent on goods manufactured in foreign countries, with a concentration of expenditures centered in the Far East. This massive spending on imported clothing contributes significantly to the United States' international trade deficit and to the loss of hundreds of thousands, if not millions, of jobs in the United States.

In fact, the entire United States retail clothing industry is burdened with certain fundamental inefficiencies. Retailers require large-footprint stores, expensive warehousing capabilities and costly fixtures and accoutrements. Significant build-out and decorating expenditures are necessary to make retail clothing stores appealing to their clientele. Substantial investments are made in inventory in order to make an appealing customer presentation. Each year an enormous amount of clothing stock undergoes dramatic price reductions in order to move distressed, end-of-season or otherwise non-selling inventory. Additionally, almost 5% of all goods are written-off as un-sellable items, or "shrink". These inefficiencies are not curable in the industry's current mode of operation.

In addition to the inherent structural inefficiencies described above, the retail clothing industry faces significant cultural challenges. Fashions change markedly, in many clothing items from season to season. Customers do not easily fit standardized sizes, and consumer tastes are fickle, often changing quickly and in an unpredictable manner. As is well-known to the reader, pre-manufactured clothing comes in pre-determined, standardized sizes. Many persons do not fit correctly into a standardized size. In fact, many consumers buy the "least worst" standardized fit and then have it tailored or just cope with an imperfect garment.

The more time-consuming the clothing supply chain becomes, that is the longer it takes from the assessment of consumer taste to the placement of goods on retailers' shelves, the greater the mark-down risk faced by the retailer and the shorter the sales cycle available to them. In theory, this gives a huge competitive advantage to domestic suppliers who can compress the time to market. In practice however, the United States has not recognized this competitive advantage. As described above, the United States retail clothing industry has both structural and cultural challenges, making profitability difficult and motivating the importation of significant percentages of inventory from low-cost, third-party countries.

While the clothing industry suffers, the United States has a surplus of underutilized, skilled labor. The United States has tens of millions of people that have manufacturing skills, would like to earn extra money and health benefits, but find a typical 9-to-5 office job impossible to balance against family needs. They may, for example, have family obligations or health problems that prevent them from working outside the house on a regular basis. They may lack access to transportation. Or, there may be no appropriate work in their geographical area. It would be highly desirable to provide opportunities whereby millions of United States citizens benefit from productive work-at-home employment.

As is known to the reader, the Internet effectively collapses geography with respect to communications between various parties. The Internet has thus been used as a communications channel whereby to create virtual offices and workplaces. In different embodiments, the Internet has been used to create a community of networked workers who provide different types of labor and services for remote employers. It is further known to use the Internet to train workers, coach and educate them on complex tasks, and evaluate their on line work product. Many different compensation scales have been used for compensating work-at-home employees.

As is discussed above, the retailing of consumer clothing is a "fickle" business. Styles change with great frequency. However, an individual consumer's generalized clothing preferences are often stable over a relatively long period of time. That is, while styles change with great frequency, individual consumer's interpretations of style are more enduring. In practice, consumers tend to cling to preferences in, for example, colors and "cuts" or styles that lend themselves to particular body types and which don't change from season to season. These preferences are predictable, and can be incorporated into new, changing styles with each successive season.

Given the state of available labor, the capabilities of the Internet as a communications medium and the particular needs of the retail clothing industry, the present inventors have determined that it would be particularly desirable to use the networking capabilities of the Internet to simultaneously solve the problems of both the labor force and the clothing industry.

SUMMARY OF THE INVENTION

The present invention provides new and improved methods and systems for facilitating the piecemeal construction of consumer goods using geographically disperse, skilled labor. In the described embodiment, the invention provides systems and methods that leverage the capabilities of electronic communications networks such as the Internet to solve the deficiencies of the clothing industry, the disadvantages of off-shore provisioners and the abundance of at-home labor. The invention simultaneously satisfies consumer's desire for custom-fitted clothing and ultra-current fashions.

In accordance with one embodiment of the present invention, there are provided methods and systems for coordinating the manufacturing of customized clothing items, a method comprising: identifying a plurality of geographically disperse skilled laborers including for each skilled laborer an indication of their skill level and current availability; receiving a customer order for a customized clothing item; identifying from the plurality of skilled laborers at least one skilled laborer available to manufacture the customized clothing item; transmitting to the identified skilled laborer raw materials and assembly instructions with which to manufacture the customized clothing item; and receiving back from the skilled laborer the completed customized clothing item.

DESCRIPTION OF THE DRAWING FIGURES

These and other objects, features and advantages of the present invention will become apparent through consideration of the Detailed Description of the Invention, when considered in conjunction with the drawing Figures, in which.

DETAILED DESCRIPTION OF THE INVENTION

There is provided herein new and improved processes and systems for manufacturing consumer items. In accordance with the present invention, the described systems and processes utilize the skills of a centralized management facility coordinating a geographically diverse labor force to cost-effectively manufacture, customized items for consumers. The invention is described herein with respect to the manufacture of clothing, and is seen to have particular relevance to the clothing industry. However, the reader will appreciate that the invention is not limited to the clothing industry but is equally applicable to other consumer goods industries.

Figure 1:
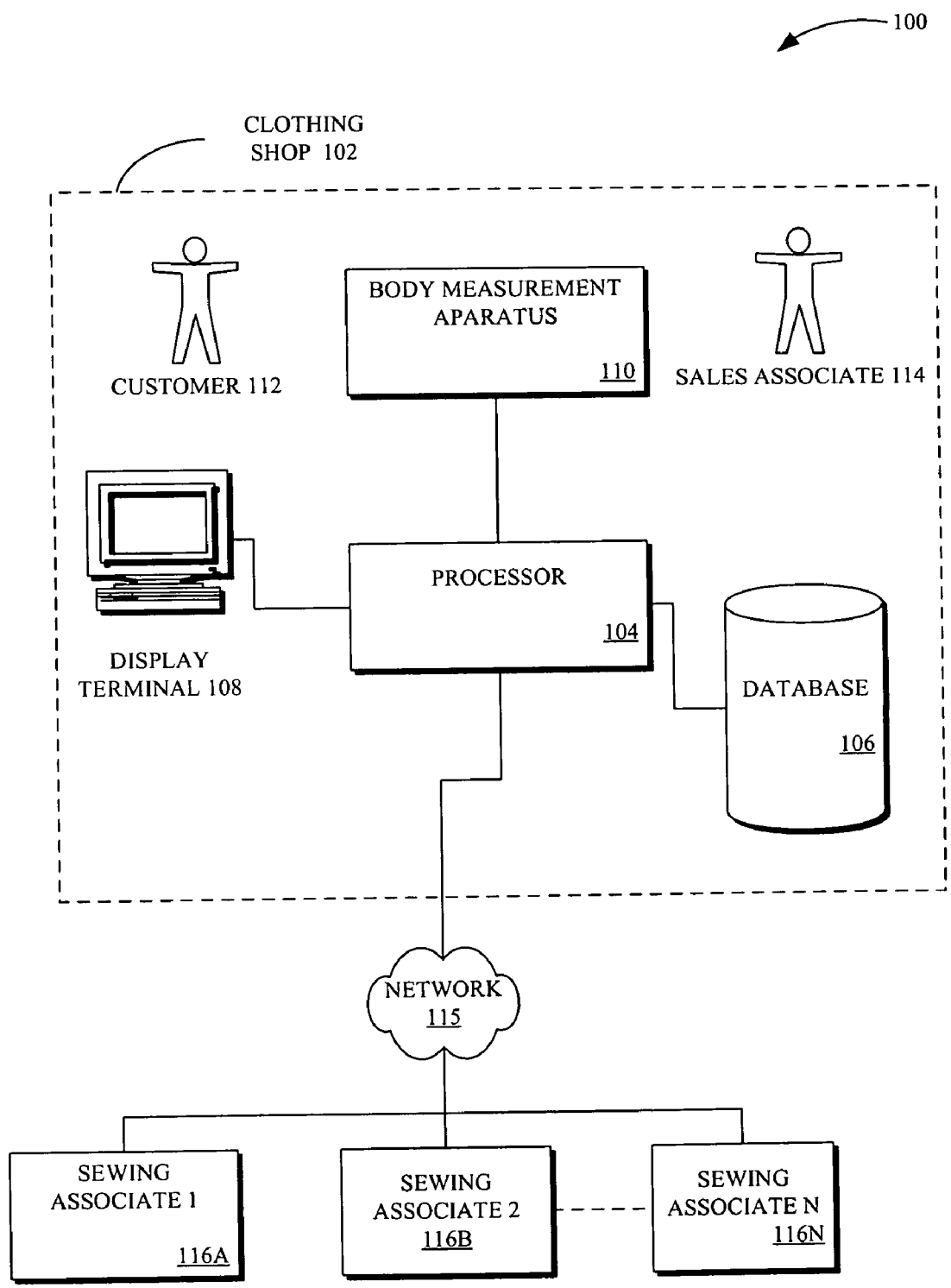
FIG. 1 is a block diagram of a clothing manufacturing system in accordance with the present invention.

With reference now to FIG. 1, there is shown and described a system 100 including a clothing shop 102 constructed in accordance with the present invention. As described in further detail below, clothing shop 102 can comprise a conventional shop, a "small footprint" shop or even a private residence. Clothing shop 102 is seen to include a processor 104 connected to a database 106 and a display terminal 108. The processor is further connected to receive body and clothing measurement data from an appropriate source 110, examples of which are described below. A sales associate 114 and a customer 112 are both shown in clothing shop 102.

Clothing shop 102 is connected to communicate with a variety of sewing associates, three of which are indicated at 116A, 116B and 116N, for example through an electronic network connection between processor 104 and a network 115 such as the Internet.

In comparison to traditional retail clothing stores of the type described herein above, clothing shop 102 preferably comprises a relatively smaller "small foot-print" store. Such a store can comprise, for example and without limitation, a relatively small retail store or even a private residence. In one embodiment of the invention, the clothing store is operated by a private individual with no storefront. In this embodiment, the store owner/manager provides services through the residences of private and/or commercial sponsors. This embodiment, analogous to the business model run by the Tupperware® Company, enables a clothing store operator to operate a full-service business with a minimum of overhead and infrastructure. Further with respect to this embodiment, clothing may be sold, for example, through sponsored parties, wherein the sponsoring individuals receive benefits such as discounts.

It will thus be seen that, in accordance with an advantage of the present invention, such a shop 102 avoids many of the burdensome costs and overhead typically associated with a traditional retail clothing outlet. As will become apparent to the reader, shop 102 avoids traditionally expensive and burdensome retail clothing store features such as inventory, displays, large numbers of employees and large quantities of expensive space and furnishings.

Processor 104, database 106 and display terminal 108 comprise components of a conventional computing system. Exemplary systems functional to perform the present invention include, but are not limited to, personal computers, servers and mainframe computers, many types and configurations of which are well known to the reader. In one embodiment of the invention, display terminal 108 comprises a large, color display terminal, capable of rendering a relatively true-life display of a customer wearing a selected clothing item in the manner described herein below.

In the described embodiment of the invention, body measurement apparatus 110 comprises an automated body scanning system, many types of which are well-known to the reader. For example, and without limitation, Human Solutions GmbH manufactures various types of body scanning equipment designed specifically to determine sizes for clothing. See for example the Human Solutions Retailor™ product. For further information regarding such products, the reader is directed to the company web site at www.human-solutions.com. Other similar products and services include: the Digisize™ software by Cyberware and the OptiFit™ and the SizeMatch™ products by Symware.

In alternate embodiments of the invention, more traditional measuring tools may be used by sales associate 114 to determine the body and clothing sizes appropriate for customer 112. For example, a traditional tape measure may be used to determine appropriate body and clothing measurements which are then entered into processor 100 through terminal 108. However they are determined, the various body and clothing size measurements of customer 112 are stored in database 106.

As described in further detail herein below, the sewing associates indicated at 116A–C comprise skilled, remote workers, for example work-at-home craftspeople connected through appropriate home computers to communicate with clothing shop 102. While three sewing associates are shown, it will be understood that numerous other sewing associates and crafts people may be used as appropriate.

Figure 2:
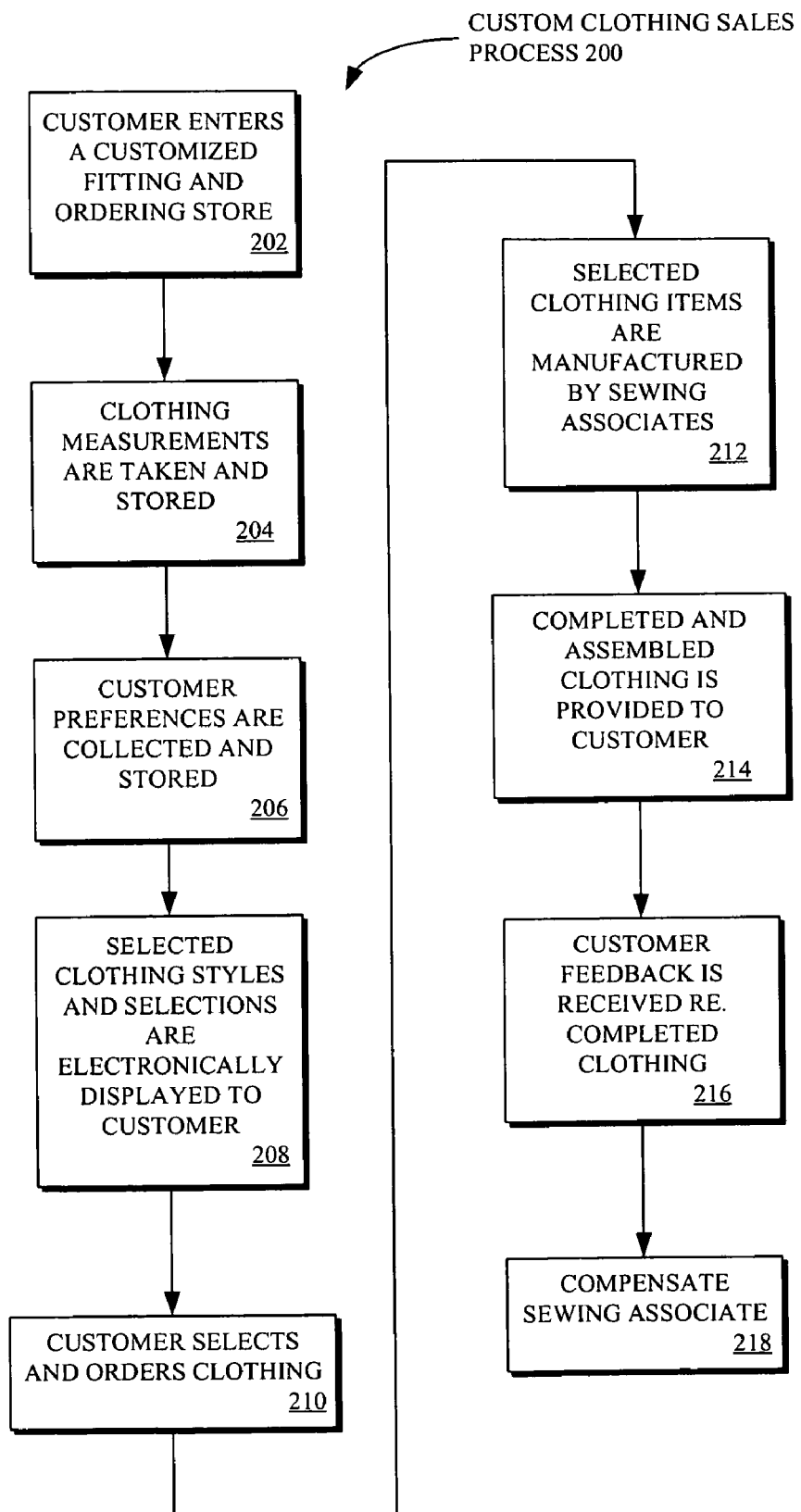
FIG. 2 is a flow chart showing a process for manufacturing clothing in accordance with the present invention.

With reference now to FIG. 2, a custom clothing sales process 200 is shown for selling customized clothing to a customer such as customer 112 in a clothing store such as clothing shop 102. In accordance with the invention, the customer enters the shop (step 202) for fitting (step 204) and item selection (step 206). As noted above, in the described embodiment of the invention, relatively exact and detailed body and clothing measurements are taken using the described body scanning technologies.

With accurate measurements in hand, sales associate 114, functioning as a "fashion consultant," uses display 108 to show the customer various clothing items, styles and colors from which the customer may choose (step 208). In one embodiment of the invention, clothing selections that interest the customer are projected onto a life-sized display screen 108, thereby providing a graphical simulation of the customer actually wearing the selected but as-yet unassembled clothing. This image can show the customer wearing the yet-to-be-made garment from all perspectives (front, back, in profile) in different venues (at work; at a party; on a street corner) in different light settings and with different accessories, including the customer's own accessories. Using the present invention, the customer can, for the first time, see what they look like in yet-to-be made clothing not just from the perspective of the mirror, but as they would look to a friend, spouse, the boss, that is from the vantage point of other people in realistic settings.

Customer preferences in color, style and fabric, along with additional useful marketing and sales information such as favorite designers, will be kept stored in database 106. Customers are asked to update the information on a periodic basis, including any changes in tastes, weight or other factors that may affect their selection of clothing. To prompt answers, customers may be asked questions about the latest designers; asked to "score" ensembles worn by the stars at notable events; to review colors and fabrications and to provide various other feedbacks as will be apparent to the reader. Such information may be collected during periodic visits by the customer to the shop, or alternatively by e-mail, facsimile communication, telephone or other appropriate forms of communication at different time intervals and/or at different events. Using this data, processor 104 can operate to assist sales associate 114 in predicting the fashions their customers will most like and are most likely to select. In the described embodiment of the invention, processor 104 is further operative to periodically adjust stored customer data, thereby adjusting clothing fit based on predictable factors such as advancing age and changes in weight.

Continuing with reference to FIG. 2, the customer selects and orders the desired clothing items in the desired colors (step 210), the sizing based upon the body and clothing measurements taken as described above. In accordance with features and advantages of the present invention, the customer can participate in the actual clothing design process. Using the tools and processes described herein, the customer can selected many of the details associated with the desired clothing, for example colors, buttons, baubles and embroidery. The selected clothing items are manufactured by the sewing associates 116 (step 212) in accordance with the process described below, and completed, assembled and provided to the customer (step 214).

Figure 3:
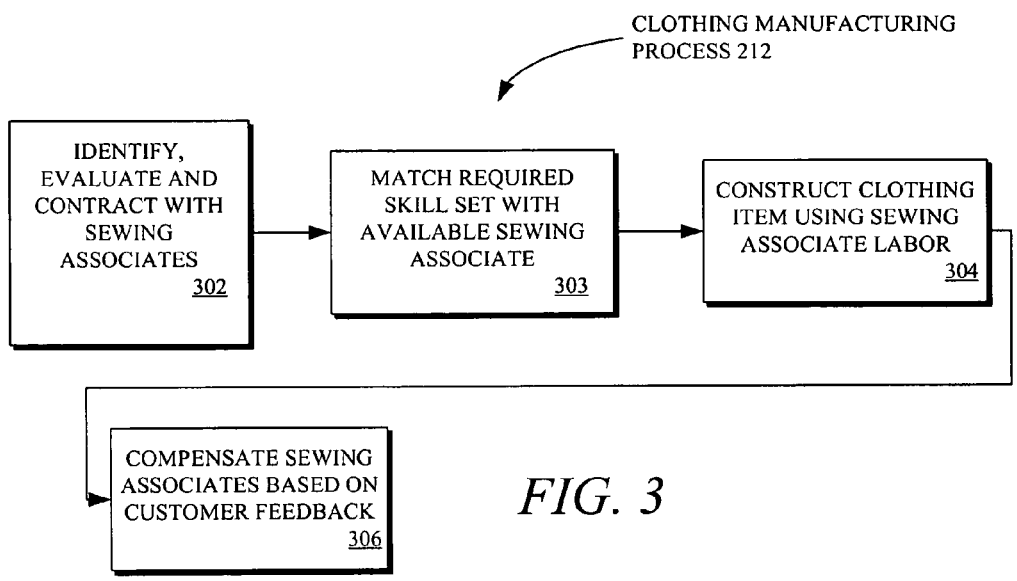
FIG. 3 is a flow chart showing the details of the clothing manufacturing process of FIG. 2.

With reference now to FIG. 3, the details of the clothing manufacturing process 212 of FIG. 2 are shown, wherein clothing shop 102 identifies, evaluates the skills of and establishes contracts with sewing associates 116 (step 302). In the described embodiment of the invention, sewing associates may be recruited, trained and qualified over the Internet. To function as a sewing associate, they will need a computer with Internet access; they must have skills in sewing and a sewing machine; and they will have had to take and pass a series of internet-based courses and tests to confirm their proficiency in sewing, understanding of fabrics and fashion and the ability to follow patterns and instructions. Thus, clothing shop 102 will have a detailed understanding of the skills and abilities of the sewing associates 116, the details of which will be stored for use in database 106. Further in accordance with the present invention, through regular electronic communications or other conventional communications channels, clothing shop 102 can keep a constant, current record of the availability of the various sewing associates 116.

Continuing with reference to FIG. 3, with the details of the clothing item known and the skill set and availability of the sewing associates known, clothing shop 102 operates to select one or more available sewing associates with the skill sets necessary to manufacture the particular clothing item(s).

Continuing with reference to FIG. 3, the customer-selected clothing items are constructed in cooperation with and using the labor of the selected sewing associates (step 304), in accordance with the details described herein below. The sewing associates are subsequently compensated, and have their further employment determined, based upon real-time feedback received from the customer upon receipt of the completed clothing items (step 306), a process described in further detail below with respect to FIG. 2.

Figure 4:
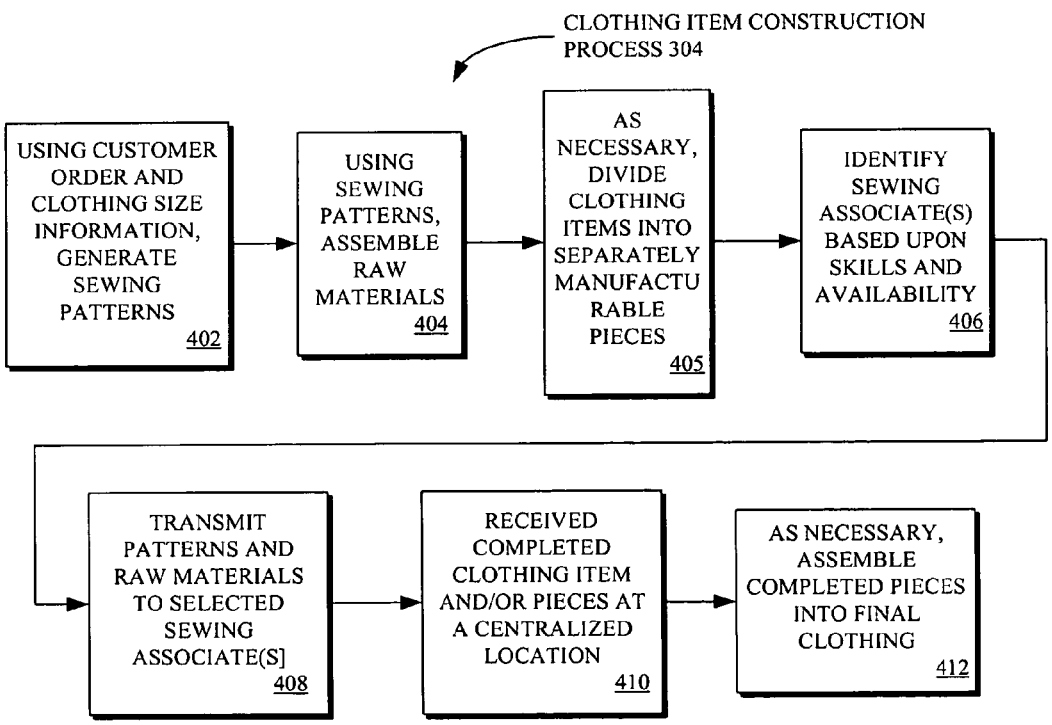
FIG. 4 is a flow chart showing the details of the clothing item construction process of FIG. 3.

With reference now to FIG. 4, there is shown the details of the clothing construction process 304 of FIG. 3. In accordance with the described embodiment of the present invention, the actual construction of the customer-selected clothing items is coordinated by a centralized source. A centralized location may comprise, for example clothing shop 102, a selected one of the sewing associates 116 or a third-party particularly skilled in the final check and/or assembly of the selected clothing items. For purposes of describing the present invention, it will be assumed that the centralized coordination of the clothing item manufacturing is performed by shop 102.

Continuing with reference to FIG. 4, processor 104 and database 106 are used, in combination with the customer order information and the customer body and clothing sizes, to generate sewing and/or other necessary assembly patterns for the customer-selected clothing items (step 402). Numerous products and services are available for converting size information into printed sewing patterns. For example, and without limitation, the reader is directed to the PatternMaster™ products by Wind Ginger Software, Inc. and the Dress Shop™ products by Livingsoft Northwest. Using the sewing patterns, the raw materials such as fabrics, buttons, thread and other materials necessary to complete the clothing items are collected (step 404).

Once the pattern is generated and the raw materials are collected, in accordance with a key feature of the invention, the skill requirements for manufacturing the clothing item are matched with the skill requirements and availability of the sewing associates 116, as stored in database 106 (step 406). Thus, a knowledgeable and skilled selling associate 116 may be readily identified for each sewing/clothing project.

Further features and advantages of the present invention provide for the various patterns and assembly instructions developed for any particular clothing item to be stored electronically in processor 104, available to selected sewing associates, the sales associate and any other parties desiring to participate in or support the clothing construction process in the manner described herein. In one embodiment of the invention, a database of various types of sewing and manufacturing instructions may be electronically stored on processor 104, the database available for use by any sewing associate facing a particular problem. Further, network 115 may be used to facilitate communications between a sewing associate and an adviser or supporter, for example in the form of another sewing associate or sales associate 114.

In accordance with one optional embodiment of the invention, the clothing item may be divided, or "pieced" into multiple components, each component for assembly by a different sewing associate 116 (step 405). It will be appreciated that, in accordance with this feature of the invention, large and complex clothing items may be assembled by a large team of geographically-disperse, skilled laborers. This provides a variety of advantages, including facilitating work-at-home jobs, the completion of complex items in relatively short time-spans and other advantages as are described herein and will now be apparent to the reader.

Continuing with reference to FIG. 4, the various sewing associates 116 are contacted by the shop, for example by e-mail, in order to confirm the availability of associates having the necessary skills to assemble the components of the customer-ordered clothing items (step 406). In one embodiment of the invention, prior customer feedback stored in database 106 is reviewed to determine the quality of previous work performed by the sewing associates as part of the process of selecting associates to complete current work. Again, it will be apparent that a significant advantage afforded by the present invention is the ability to quickly and easily identify appropriately skilled sewing associates available to perform particular tasks.

Once the patterns are created, and the raw materials and sewing associates are identified, the appropriate pattern pieces along with the associated raw materials are transmitted to a selected sewing associate, or where multiple sewing associates have been identified, each of the selected sewing associates (step 408). For example, if the customer-ordered clothing item is a jacket, the pattern pieces and raw materials for the various parts, that is the sleeves, front, back and collar, may each be shipped to a single sewing associate or to a plurality of different sewing associates for their completion.

Upon completion, the clothing item is shipped from the sewing associate back to clothing shop 102. If multiple sewing associates have been used, each completed piece is transmitted to and received by the centralized location, in this described embodiment shop 102 (step 410). Where multiple sewing associates have provided multiple clothing components, skilled labor, for example a particularly skilled sewing associate as described above, is then engaged to assemble the completed pieces of the clothing item into the final, complete clothing item (step 412). As noted with respect to FIG. 2 above, the completed clothing item is delivered to the customer. Delivery may be, for example, in-person at shop 102 (step 214). Alternatively, delivery may be, for example, by shipment directly to the customer's residence or place of business.

With reference now back to FIG. 2, in accordance with the present invention, customer feedback is received regarding the completed clothing item(s) (step 216). In accordance with features and advantages of the present invention, this customer feedback is used in a variety of ways to manage and compensate the sewing associates and to improve the product and process quality whereby to provide better service to the customer. In accordance with one embodiment of the present invention, customer credit card information is collected, but the customer is not actually billed until they have indicated their satisfaction with the completed clothing item. Actual customer feedback and/or the expiration of a particular period of time may be used to indicate complete customer satisfaction with the clothing item. The satisfaction scores are used as a ranking to help determine compensation for sewing associates (step 218) as well as to determine which future projects sewing associates may be asked to provide services for. High customer scores will result in better compensation and more work; poor scores will be addressed with the requirement of more internet-based training or, if required, termination. Further, the relative skills of the sewing associates as reflected in database 106 may be updated based on customer feedback. In accordance with features and advantages of the invention, the use of customer feedback to compensate and manage the sewing associates provides a "closed loop" system between the customer, the sales associate, and sewing associates.

In an embodiment of the present invention, resources are provided for providing customer 112 with matching accessories to a selected clothing item. For example, arrangements may be made with such accessory providers as: shoe manufacturers, handbag manufacturers, jewelry manufacturers and others. In accordance with these arrangements, the details of custom-ordered clothing are provided by clothing shop 102 to these accessory suppliers such that customized, matching accessories may be developed and provided to the customer along with the completed clothing items. In accordance with an embodiment of the invention, customer sizes, measurements and preferences regarding accessories may be collected and stored in association with processor 104 (see steps 204 and 206 with respect to FIG. 2 above). Thus, any accessories desired by customer 112 may be custom-manufactured to the same quality and standards as the custom-manufactured clothing items.

There have thus been provided new and improved methods and systems for manufacturing consumer products such as clothing. In accordance with the invention, customer measurements and preferences are collected by a unique, small-footprint or private custom clothing shop. These measurements and preferences are stored and used in association with the manufacturer of custom clothing. Ordered clothing is manufactured through the provision of patterns, instructions and materials to skilled, pre-qualified sewing associates. In one embodiment of the invention, the consumer products are "broken" into discrete, separately-manufacturable pieces, each piece for assembly by a separate, geographically remote, skilled labor with final assembly of the various pieces is performed at a centralized location. Customized clothing can thus be manufactured by a highly skilled, cost effective and geographically disperse labor force, using electronically stored data and electronic communications to both coordinate manufacturing and ensure high-quality results. The invention thus solves many of the traditional problems associated with the retail clothing industry. It further solves many of the problems facing today's skilled but geographically diverse and time-challenged labor force.

While the invention has been described with respect to particular embodiments, it is not thus limited. Numerous changes and improvements within the scope of the invention will now be apparent to the reader.

What is claimed is:

1. A method operable on a computer for coordinating the manufacturing of customized clothing items, comprising:

identifying a plurality of geographically disperse skilled laborers including for each skilled laborer an indication of their skill level and availability;

receiving a customer order for a customized clothing item;

identifying from the plurality of skilled laborers a plurality of selected skilled laborers available to manufacture the customized clothing item;

identifying a plurality of separately manufacturable components, the assembly of which comprises the customized clothing item;

matching each of the plurality of separately manufacturable components with a selected skilled laborer;

transmitting to each of the selected skilled laborers the raw materials from which to manufacture their respective manufacturable component;

transmitting to each of the selected skilled laborers assembly instructions with which to manufacture their respective manufacturable component;

receiving back, from each of the selected skilled laborers, in a central location, each of the manufactured components; and assembling the manufactured components to complete the customized clothing item.

2. The method of claim 1 wherein the step of matching each of the plurality of separately manufacturable components with a respective selected skilled laborer includes the step of electronically communicating with the plurality of skilled laborers to determine their current availability.

3. The method of claim 1, wherein the step of identifying a plurality of geographically disperse skilled laborers includes the step of storing, for each of the plurality of skilled laborers, an indication of skill based at least in part on past performance.

4. The method of claim 1, wherein the step of identifying a plurality of geographically disperse skilled laborers includes the step of educating the skilled laborers using online electronic educational materials.

5. The method of claim 1 wherein the step of receiving a customer order for a customized clothing item includes the steps of:
hosting a customer at a retail store; and
electronically scanning the body size of the customer to determine the size of the customized clothing item.

6. The method of claim 5 wherein the retail store is situated in a private residence.

7. The method of claim 1 and further including the step of delivering the completed customized clothing item to the customer.

8. The method of claim 7 and further including the step of receiving from the consumer feedback relating to the satisfaction of the customer with the customized clothing item.

9. The method of claim 8 and further including the step of using the customer feedback to determine the compensation for the selected skilled laborer.

10. The method of claim 8 and further including the step of using the customer feedback to select additional skilled laborers to participate in manufacturing other customized clothing items.

11. The method of claim 1 and further including the step of electronically displaying to the customer a graphical image of the completed customized clothing item prior to the actual construction of the customized clothing item.

12. The method of claim 1 and further including the steps of:
determining body measurements of a customer ordering the customized clothing item; and
storing the body measurements on the computer.

13. The method of claim 12 and further including the step of periodically adjusting the stored body measurements.

14. The method of claim 13 wherein the step of periodically adjusting the stored body measurements is performed based on the occurrence of at least one of the group comprising predictable aging of the customer and weight changes of the customer.

15. A system for coordinating the manufacturing of customized clothing items, comprising:
a processor;
a memory connected to the processor and storing instructions for operating the processor to perform the steps of
identifying a plurality of geographically disperse skilled laborers including for each skilled laborer an indication of their skill level and availability;
receiving a customer order for a customized clothing item;
identifying from the plurality of skilled laborers a plurality of selected skilled laborers available to manufacture the customized clothing item;
identifying a plurality of separately manufacturable components, the assembly of which comprises the customized clothing item;
matching each of the plurality of separately manufacturable components with a selected skilled laborer;
transmitting to each of the selected skilled laborers the raw materials from which to manufacture their respective manufacturable component;
transmitting to each of the selected skilled laborers assembly instructions with which to manufacture their respective manufacturable component;
receiving back, from each of the selected skilled laborers, in a central location, each of the manufactured components; and
assembling the manufactured components to complete the customized clothing item.

16. A system for coordinating the manufacturing of customized clothing item, comprising:
means for identifying a plurality of geographically disperse skilled laborers including for each skilled labor an indication of their skill level and availability;
means for receiving a customer order for a customized clothing item;
means for identifying from the plurality of skilled laborers a plurality of selected skilled laborers available to manufacture the customized clothing item;
identifying a plurality of separately manufacturable components, the assembly of which comprises the customized clothing item;
matching each of the plurality of separately manufacturable components with a selected skilled laborer;
transmitting to each of the selected skilled laborers the raw materials from which to manufacture their respective manufacturable component;
means for transmitting to each of the selected skilled laborers assembly instructions with which to manufacture their respective manufacturable component;
receiving back, from each of the selected skilled laborers, in a central location, each of the manufactured components; and
assembling the manufactured components to complete the customized clothing item.

17. A method operable on a computer for coordinating the manufacturing of customized clothing items, comprising:
identifying a plurality of geographically disperse skilled laborers;
receiving a customer order for a customized clothing item;
identifying a plurality of separately manufacturable components of the customized clothing item, the assembly of which comprise the customized clothing item;
matching each of the plurality of separately manufacturable components with a respective selected skilled laborer;
transmitting to each of the selected skilled laborers the raw materials from which to manufacture their respective manufacturable component, the raw materials for at least one of the manufacturable components including a sewing pattern and cloth;
receiving back, from each of the selected skilled laborers, in a central location, each of the manufactured components;
assembling the manufactured components to complete the customized clothing item;
providing the completed customized clothing item to the customer;
receiving feedback from the customer relating to the customer's satisfaction with the customized clothing item; and
using the feedback from the customer to determine an action with respect to at least one of the selected skilled laborers.

* * * * *